(12) United States Patent　(10) Patent No.: US 7,212,328 B2
Jilani et al.　(45) Date of Patent: May 1, 2007

(54) ELECTRON-BEAM ACTUATED LIGHT MODULATOR WITH A MECHANICAL STOP

(75) Inventors: Adel Jilani, Corvallis, OR (US); James Z. Guo, Corvallis, OR (US); Charles G. Schmidt, Corvallis, OR (US); Steve P. Hanson, Corvallis, OR (US); Jeff Obert, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/064,359

(22) Filed: Feb. 22, 2005

(65) Prior Publication Data

US 2006/0187522 A1　Aug. 24, 2006

(51) Int. Cl.
*G02B 26/00*　(2006.01)

(52) U.S. Cl. ...................... 359/291; 359/290
(58) Field of Classification Search ................ 359/291, 359/290, 292, 295, 298, 223, 224, 900, 245
See application file for complete search history.

(56) References Cited

U.S. PATENT DOCUMENTS 6,885,494 B2 *　4/2005　Patel et al. ................. 359/291
6,900,915 B2 *　5/2005　Nanjyo et al. .............. 359/199

* cited by examiner

*Primary Examiner*—David Spector
*Assistant Examiner*—Tuyen Tra (57) ABSTRACT

An electron beam actuated light modulator, including an actuatable mirror element carried by a pedestal and hinge portion, having an electrostatically more neutral first position and an electrostatically more charged second position, the mirror being actuatable in a first direction from the first position to the second position by charge accumulation, and is actuatable in a second direction from the second position to the first position by dissipation of the charge accumulation and a stop element positioned adjacent the mirror element in the first position, configured to limit movement of the mirror element in the second direction after the mirror reaches the first position traveling in the second direction.

32 Claims, 11 Drawing Sheets

ELECTRON-BEAM ACTUATED LIGHT MODULATOR WITH A MECHANICAL STOP

BACKGROUND

The invention relates to spatial light modulators. More specifically, the invention relates to spatial light modulators including an array of light-modification elements which are individually controllable, and analogous to image pixels.

Micro-devices configured as light modulators have found application in a number of areas of technical endeavor. These include, but are not limited to, computing and data storage, displays, and telecommunications. Arrays of light modifying elements are conventionally fabricated by CMOS-compatible processes on silicon. The cost of CMOS-based circuits is usually high, and the reliability can be low due to a need of many layers of thin-film process-created structure. The size of conventional elements in such an array, and thus the resolution of the device, is typically limited by the manufacturing process.

SUMMARY

An electron beam actuated light modulator, including an actuatable mirror element carried by a pedestal and hinge portion, having an electrostatically more neutral first position and an electrostatically more charged second position, the mirror being actuatable in a first direction from the first position to the second position by charge accumulation, and is actuatable in a second direction from the second position to the first position by dissipation of the charge accumulation and a stop element positioned adjacent the mirror element in the first position, configured to limit movement of the mirror element in the second direction after the mirror reaches the first position traveling in the second direction.

BRIEF DESCRIPTION OF THE DRAWING FIGURES

FIGS. 8–26 are process flow diagrams illustrating an example method of making a spatial light modulator such as that shown in FIGS. 1–5, wherein:

DETAILED DESCRIPTION OF EXAMPLE EMBODIMENT(S)

Figure 1:
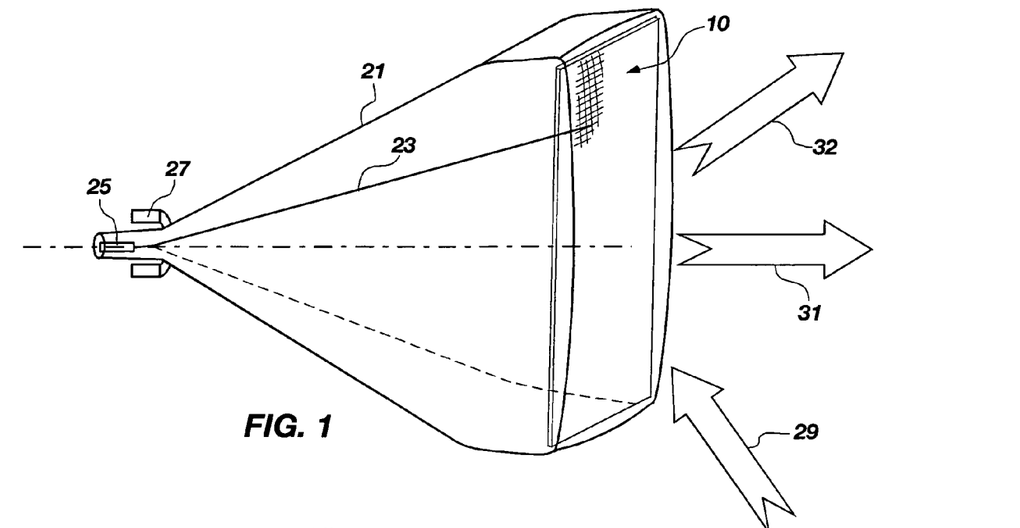
FIG. 1 is a schematical illustration of an example environment of an example mirror array spatial light modulator in accordance with an example embodiment.
Figure 2:
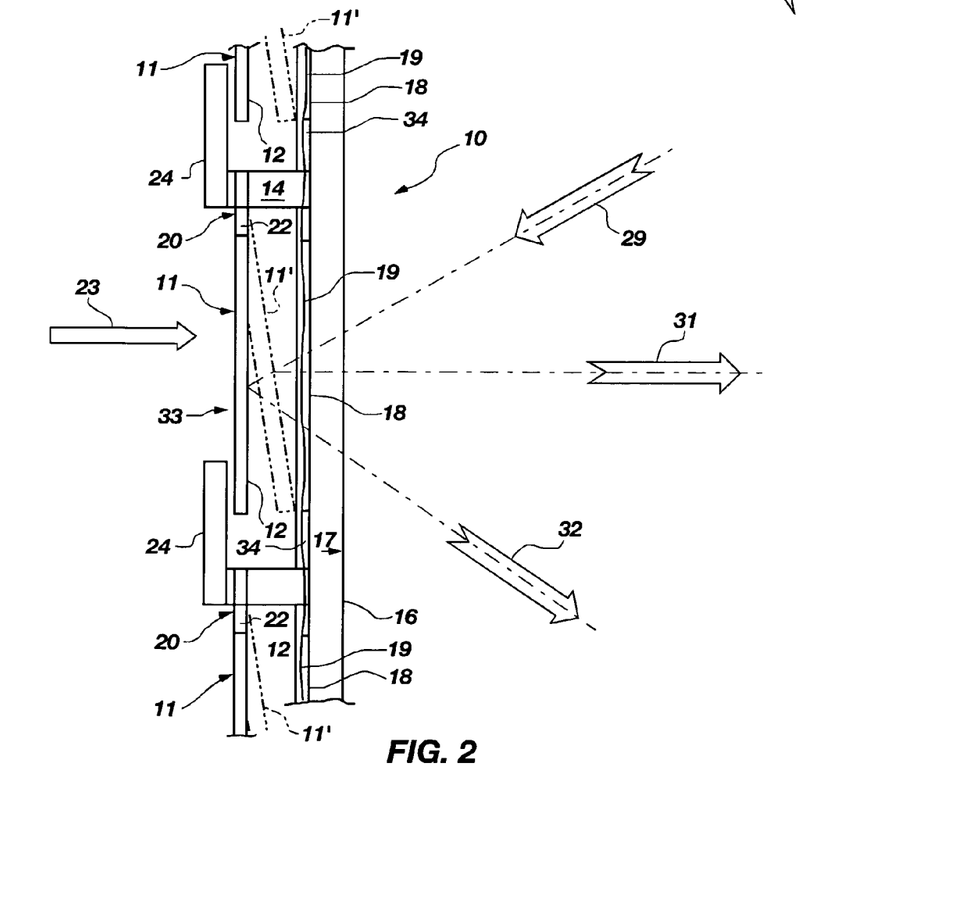
FIG. 2 is a schematic crossectional view of a portion of a spatial light modulator similar to that shown in FIG. 1, the relative orientation of modulated light being reversed however, and a second position of the mirror elements being shown in outline.

With reference to FIGS. 1 and 2, a spatial light modulator (SLM) 10 includes a multiplicity of actuatable metal (e.g. Al or AlCu) mirror elements 11 each having a mirror portion 12 of about 10×10 µm area and 0.25 µm thickness. Each mirror element is supported by a conductive pedestal or post 14 adjacent a transparent substrate 16, for example formed of a glass. The substrate has other transparent structure formed thereon, including an electrode 18 of 10×9 µm area associated with the mirror element and positioned about 1.25 µm ahead of it with respect to a front side 17 of the modulator. The electrode can be formed of Indium-Tin-Oxide (ITO) in one example embodiment. A dielectric layer 19, which in the illustrated embodiment is a 0.1 µm layer of $SiO_2$, overlays the electrode. Each mirror element includes a plurality of hinge portions 20 defined by the outer limits of the mirror element adjacent an opening 22.

When positioned in a vacuum environment within a cathode ray tube (CRT) 21, the mirror elements 11 are individually addressable by a controlled and focused electron beam 23, for example one emitted from a cathode 25. The beam can be turned on and off, and can be conventionally field controlled (e.g. by a controllable magnetic field generator 27) to scan through the array of mirrors provided by the modulator 10, turning each one on or leaving it off as will be described below. For example, the mirror array can be scanned once each frame of a frame-refreshed graphic or video signal. Each mirror element is either charged or left uncharged by the beam in the scan for the frame. The charged mirror elements 11' leave a first un-deflected position, and deflect toward each of the electrodes 18 associated therewith to a second position illustrated in outline. In the illustrated example this second or deflected position (11') corresponds to an "on" state of the mirror 12 for the frame, while the first, or an undeflected position corresponds with an "off" state. Light 29 to be modulated is sent to the SLM 10, for example once each frame, after the scan by the electron beam 23 has completed, and the mirrors have been thus set for the frame. With respect to each mirror 12 in the SLM array, the light 29 is either reflected in a first direction 31 corresponding with an "on" state of each mirror, or in a second direction 32 corresponding with an "off" state of each mirror, depending on the position of each mirror. Thus a pixilated image can be formed in the reflected light traveling along the directions 31, 32, one being a negative and one being a positive image with respect to each other. Either of the modulated light streams can be further processed in the application to which the modulator is being put. It will be appreciated that while a graphics and video display application has been alluded to, and will be further discussed herein, others are contemplated.

In one embodiment, the mirrors 12 of the modulator 10 are reset between each frame (scan), so as to be at a first or "off" position unless charged by electrons from the electron beam 23 in the next scan for the next frame. Furthermore, each mirror element 11 has associated with it at least one stop element 24 configured to arrest and damp the motion of the mirror element, and thus to overlap at least a portion of the mirror element. That portion can be very small, just catching an edge of the mirror element, or can overlap a considerable distance, so that it extends well into the interior of an outer surface of the mirror element, for example 10 to 50 percent of a dimensional distance across the mirror element. It can extend even longer in other embodiments.

The size and configuration of the stop is chosen so that a mass and length and width of the stop (affecting its performance in its function as a stop) are balanced against the goal of placement and sizing of the stop for minimizing its interception of electrons from the electron beam. The stop can be formed of the same material as the mirror element, or of a different material. For example in another example embodiment the mirror can be formed of the material mentioned above or another metal, and the stop can be formed of a non-conductive material. In this latter example interception of electrons from the electron beam is less of a concern, but ductility and fatigue life of the material chosen for the stop, as compared to a metal, remain a concern.

The stop 24 provides a limitation on movement of the mirror portion 12, preventing movement of the mirror portion in a direction away from the electrode 18 after reaching the first, or un-deflected nominal charge position, which is vertical in the figures, from a second, or deflected, position inclined against the dielectric layer 19 over the electrode 18 (shown by deflected elements 11' in the figures) resulting from an increase in charge differential between the mirror element and the electrode. The second position corresponds with the "on" state mentioned, where the mirror is angled because the mirror element is drawn toward the electrode by electrostatic forces generated by an increase in charge caused by interception of electrons from the electron beam in a scan through the mirror array of the SLM 10.

Figure 3:
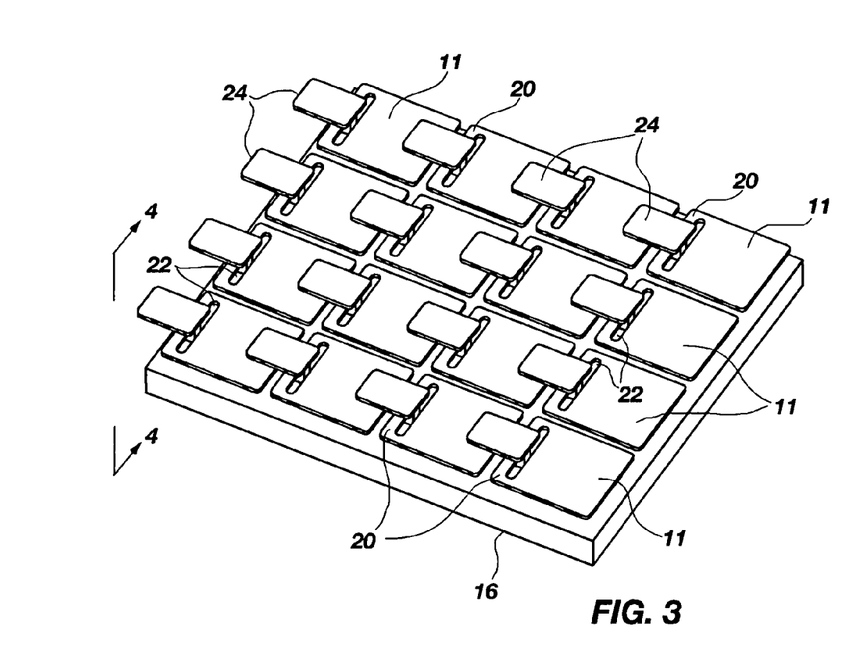
FIG. 3 is a perspective schematic illustration of a broken-out portion of a mirror array of a spatial light modulator in accordance with an example embodiment of the invention such as that shown in FIGS. 1 and 2.
Figure 4:
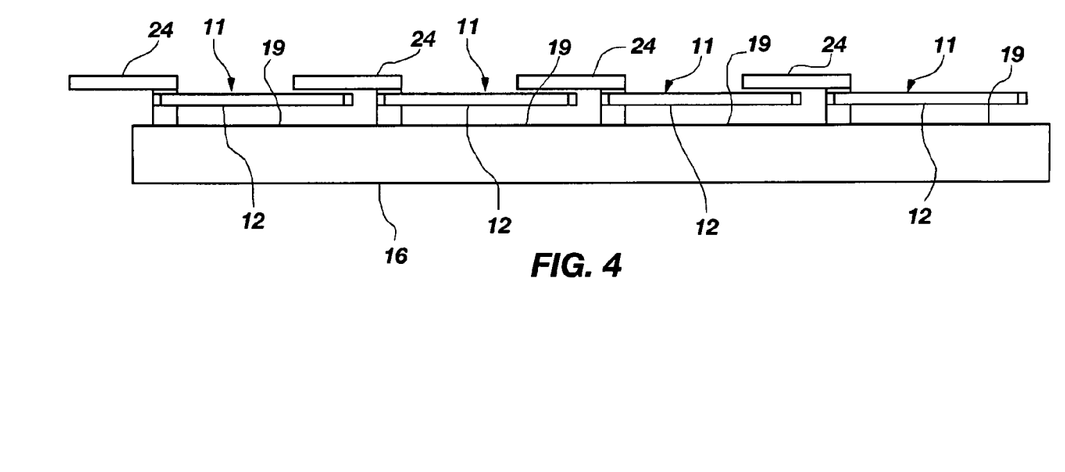
FIG. 4 is a schematic crossectional view, taken along line 4—4 in FIG. 3 of a portion of the array shown in FIG. 3.
Figure 5:
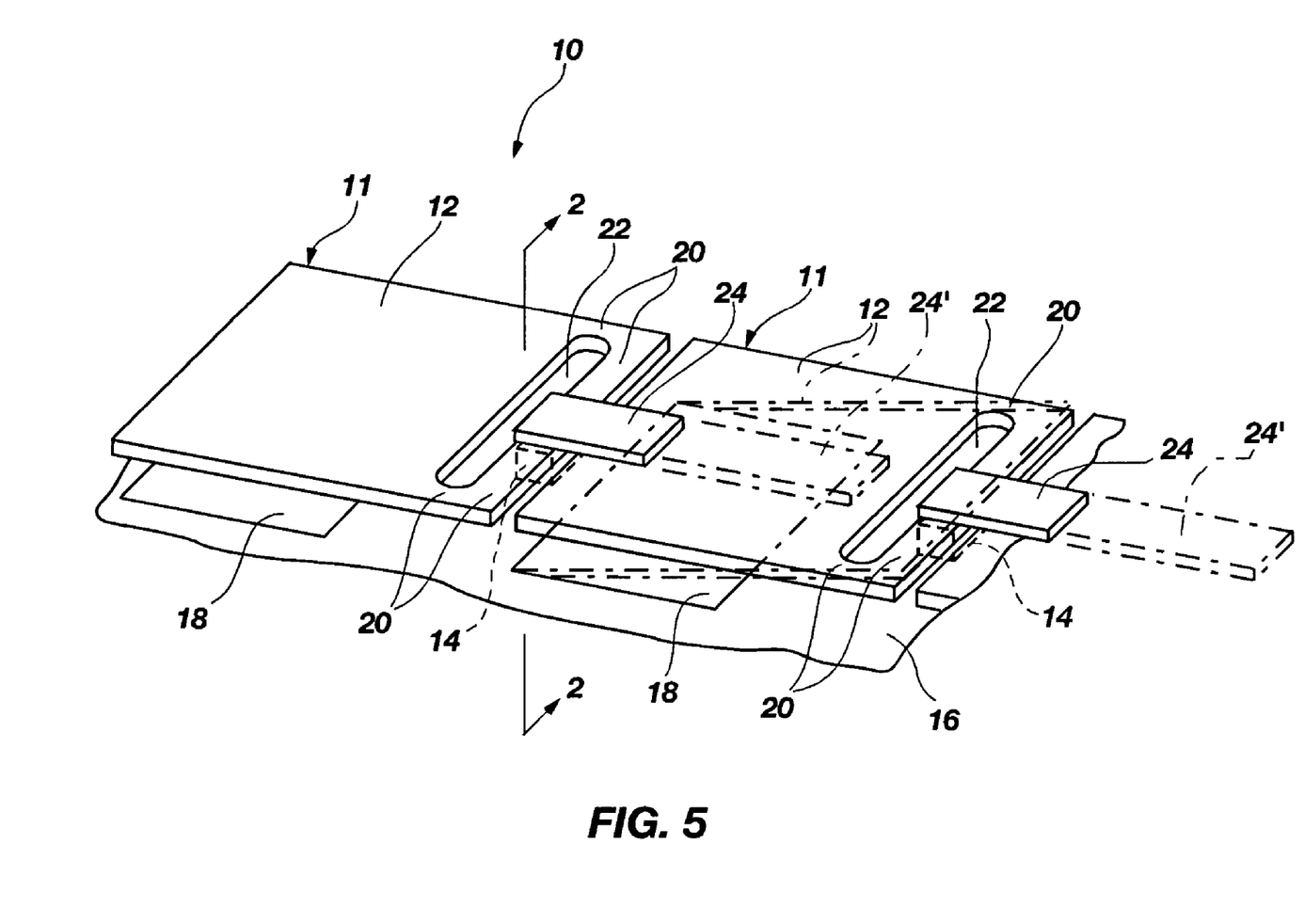
FIG. 5 is a perspective schematical illustration of a broken-out portion of a mirror array of a spatial light modulator in accordance with an example embodiment of the invention, a second position of a mirror element being shown in outline.

Since the micro-mirror elements 11 in operation are positioned within a vacuum environment in the CRT 21, they move easily between the first and second positions. As mentioned, the stop element 24 functions to arrest motion of the mirror element in the second direction and it acts to absorb energy therefrom; as the stop element deflects in response to being struck by the mirror element. This prevents the mirror element from moving substantially past the first position and damps rebound of the mirror element, reducing the time for it to settle into the first position. This can be important in many applications as will be further discussed below. With reference to FIGS. 3 and 4, a better appreciation of the overall structure of the SLM 10 in the illustrated example embodiment can be had with reference to a broken-out 16-pixel portion of the modulator, illustrated showing a back side (33 in FIG. 2) of the SLM. The mirror portions (12 in FIG. 2) face downward and away, while the mirror elements 11 are seen as they would present to the focused electron beam (23 in FIG. 1). It will be appreciated that each of the mirror elements is confined to the area between the stops 24 and the dielectric layer 19 over the structure formed on the substrate 16. Moreover, it will be appreciated that the hinge portion 20 includes structure adjacent the stop 24 for an adjacent mirror element, and the mirror portion (12 in FIG. 2) of the mirror element 11, and is defined by the outer shape aspect of the mirror element, and the opening 22 formed therein, in each instance, in the illustrated example.

With reference again to FIGS. 1 and 2, in this example embodiment the SLM 10 is positioned so as to present a bottom or front (depending on how it is viewed) surface 17 of the glass substrate 16 outward, while a top, or back, portion 33 of the SLM is available to be scanned by a focused electron beam 23 inside the CRT 21. In more detail, the electron beam can be made to scan through the array of mirror elements 1 of the SLM at a selected refresh rate. The focused electron beam is itself modulated in at least one of on/off state, dwell time, and intensity, with respect to each mirror element location in the array of the SLM, so that the charge on individual mirror elements is changed in a controlled way.

In one embodiment by means of switching on and off the beam as it moves across the individual mirror elements 11 (here analogous to pixels) the focused electron beam 23 can selectively provide an increase of electrostatic charge, or not provide a change in charge, with respect to each mirror element in the array, during each scan cycle. A cycle here can include a single scan through, or a frame, etc. or multiple scans. Multiple scans may be used, for example, in color graphic applications where each mirror element is a sub-pixel, and a set of sub pixels are used for each color and each color set is created by a separate scan for that color (e.g. a three color system of this type can use three scans per frame).

It will be appreciated that when charged, a mirror element 11 having a mirror portion 12 moves in the first direction toward, and then contacts, the dielectric layer 19 over the electrode 18 carried by the substrate 16. This is due to a capacitive effect, which sets up an oppositely charged electron regime in the electrode. The electrostatic forces thus set up cause the movement of the mirror element, bending it about the hinge portion 20 inducing flexure and torsional strain in the hinge portion. This second or deformed position in contact with the dielectric layer 19 of the substrate 16 adjacent the electrode 18 can also be called a charged, or landed position. The mirror element in the example is returned to the first, nominal, or undeflected (more charge neutral) position by bleeding off the charge differential between the mirror element and the electrode.

Decreasing the charge differential to move the mirror element back to the first position from the second position can be done in a number of ways. Moreover, the process is not entirely simple and straightforward conceptually, though in the example embodiment the implementation is advantageously quite simple. As will be appreciated by one skilled in the art, part of the process of coming to charge equilibrium can involve a secondary emission of electrodes from the mirror element. As is known, bombardment of the mirror element 11 by a focused beam 23 will set up a secondary emission of electrons (not shown) from the mirror element, as not all the electrons will be retained in the material and the acceptance of additional electrons excites the atoms of the material, causing other electrons to be ejected (secondary emissions). Likewise, capacitive effects will cause a change in charge on the electrode 18, which can also involve secondary emissions of electrons.

Moreover, as the charge differential between the mirror element 11 and the electrode 18 is dissipated (or in other words is brought toward parity—though of opposite polarity—at a charge level below what is needed to overcome the restoring force in the hinge 20), secondary emissions can occur. The charge differential, and thereby the electrostatic forces, acting on the mirror element to actuate it can be controlled by controlling the amount of charge, and the flow of charge. This is done in the illustrated examples by means of: a) the electron beam; b) a controlled conductive pathway, as discussed below in more detail, between the mirror element and the electrode. The controlled conductive pathway in the illustrated embodiments herein may be a simple resistive pathway configured to bleed charge differential off at a known selected rate, thus allowing a material-dependant restoring force to move the mirror element to the first position from the deflected second position. Other methods (not shown) can involve switching devices, and one or more connectable ground potentials (not shown). For example, possible methods involve use of a fixed resistor (e.g. 34 in FIG. 2), a variable resistor (not shown), or an active element such as a transistor, photo diode, or photo transistor (all conventional, not shown) in the conductive pathway(s) in controlling charge bleed off from the electrode 18 and/or mirror element 11 of the device 10, either relative to each other, or to said other connectable ground(s). In the illustrated embodiment the electron beam can move the mirror in the first direction by increasing charge differential, and then the particular method chosen (for example from the examples just mentioned) to move the mirror back in the second direction does so by decreasing charge differential and thus allowing other forces, such as spring (restoring) forces in the hinge portion 20 of the mirror element, and/or other forces, to overcome electrostatic forces acting in the first direction and move the mirror element back.

Returning to the illustrated example shown in FIGS. 1 through 4 in further detail, as the electrostatic charge difference is reduced as discussed above, and the electrostatic force acting to bias the mirror element 11 in a first direction toward the electrode 18 is reduced, a restoring force set up by the deformative strains (flexural and torsional) in the hinge portion 20 can return the mirror portion to the first, or un-deformed position. Thus it moves a second direction from the second position landed against the dielectric layer 19 to the first position as discussed. Moreover, the SLM 10, once initially scanned through by the electron beam 23, and the charge dissipated, can have a charge equilibrium state where the mirror elements are located at the first position. Therefore afterward, as to each mirror after each scan, as the charge differential dissipates, the mirror will return to the first position due to dissipation of electrostatic forces as well as mechanical restoring forces in the material of the hinge portions 20.

However, in another embodiment the mirror element 11 or the electrode 18 in each case can be connected to a source of potential so that relative to the electrode the mirror element is initially nominally charged in the same polarity so to have a slight repulsion from the electrode. In this manner the mirror is biased towards the first position by electrostatic forces, and dissipation of electron beam 23—added charge can fully occur only after the mirror element has reached its first position returning in the second direction. In one example embodiment, the electrostatic forces can predominate over mechanical restorative forces in moving the mirror from the second back to the first position. In another example embodiment the mechanical forces can predominate over the electrostatic forces in moving the mirror back to the first position.

Providing the stop 24, and thus limiting movement in the second direction once the mirror reaches the first position, reduces oscillation ("ringing") of the mirror element 11 that may occur in returning to the first or undeformed position. As will be appreciated, the stop prevents the mirror portion moving onward in the second direction past the first position and continuing until a restoring force in the hinge builds up, or charge changes by current flow and secondary emissions accumulate to the point where momentum is checked, then these forces move the mirror back in the first direction past the first or charge-neutral (undeformed) position onward again in the first direction until checked by the building restoring forces, electrostatic forces, etc. in the opposite direction; and then moving back in the second direction, etc., until the oscillation just described dies down, for example due to conversion of momentum to heat energy. The conversion of momentum to heat in the hinge and surrounding air, and regulation of the charge bleed off (and thus the electrostatic force) by regulation of the charge on the electrode are techniques usable to damp the mirror ringing phenomenon without provision of the stop, but the resulting oscillations use time in the frame-refresh cycle, and use up fatigue life of the hinge. Neither the extra time needed to settle the oscillations, nor the extra repeated bending of the hinge, are desirable attributes in a typical application of the SLM 10.

The stop 24 mechanically prevents continued movement of the mirror element 11 in the second direction past the first or un-deformed position. Moreover, impact with, and rebounding from, the stop further dissipates momentum by conversion of impact-imparted energy to heat in the stop and pedestal 14 elements, and a bouncing movement of the mirror element 11 off the stop imparts energy to the surrounding air molecules with less overall travel of the mirror.

As will now be more readily appreciated, without the stop a controlled alteration of the rate of charge bleed off (requiring additional complexity in control of charge differential at the electrode 18 and/or mirror element 11) and momentum-heat conversion, may be the sole mechanism for damping mirror oscillations. This mirror oscillation is not desirable, particularly in video display applications, as without the stop 24 the "ringing" phenomenon can limit refresh rates in the scanned array, as the time required to settle each mirror 12 into its first, or charge neutral position, prior to the next focused electron beam 23 scan-through can force a delay to when the next scan-through of the array can occur. This delay is undesirable, potentially lowering the frame refresh rate in a video application to unacceptably low levels affecting perceived quality of the presentation of the video program material. It has been found that practical limitations on control of a charge decay function can potentially limit the usefulness of this kind of modulator in display applications due to the need for high cycling rates in video program material display. Hence the stop element 24 can be very useful in increasing the speed of the SLM device 10 so as to be usable in such applications.

Moreover, as alluded to, by reducing the amount of ringing oscillation movement of the mirror element 11 carrying the mirror portion 12, flexural and torsional movement in the hinge areas 20 is very much reduced. Thus, a longer period of time will elapse before a fatigue limit of the metal material in the hinges is reached. This can improve reliability in the device 10 by delaying fatigue failures in the hinges of the mirror elements of the array. Beneficially, it gives the SLM 10 device a longer service life.

Returning to the discussion of actuation of the mirror elements 11 in detail, the control of charge on the mirror element in the particular example illustrated in FIGS. 1–5 first involves controlling a ratio of primary electrons added to each mirror element 11 by the beam 23, and the number of secondary electrons (not shown) emitted from each mirror as a result of interception of the primary electrons as mentioned above. A more detailed discussion of this can be found in commonly assigned and co-pending U.S. application Ser. No. 10/743,603, filed Dec. 21, 2003, which is hereby incorporated herein by reference for the teachings consistent herewith. The rate of change in the charge on the mirror element can control the timing aspects of change in position of the mirror element and the length of time it remains at a deformed position before returning to the un-deformed or nominal position.

In the example embodiment the mirror element 11 can be returned to the first position by dissipation of the accumulated charge through a conductive pathway at a known constant rate. This is done in the illustrated example by bleeding off charge through a resistor 34 (FIG. 2) connecting the electrode 18 to the mirror element 11 via the post 14 that is formed of a metal, or another conductive material. As will be appreciated, in other embodiments (not shown) the charge can be otherwise dissipated, but the illustrated example is simple and straightforward in that each of the mirror elements will return to the undeformed first position (shown by reference 11) from the second or deformed position (shown by reference 11') within a period of time known from the relationship of the magnitude of the capacitive charge (given by the ratio mentioned) on the mirror element with respect to the electrode, and the resistance of the resistor 34 and conductive pathway.

Thus, as to each mirror element 11, light 29 applied in the form of a flood pulse or flash, will be reflected by the modulator at each array element, or pixel, in one of at least two directions corresponding with mirror 12 position (angle) as set forth above. In the illustrated embodiment one reflected light direction 31 corresponds with a second position of the mirror element 11' or "on" as light continues in a path from direction 29 through the substrate 16 and electrode 18 and dielectric layer 19, all of which are formed of transparent material at this scale, and reflects from the mirror 12 and back out through that structure along the direction 31 to be further processed depending on the application. For mirror elements 11 in the nominal or "off" position the light is reflected along the other direction 32, and as mentioned, and this creates a negative image of the modulated light sent in the other direction 31.

In this way light 29 is modulated, and, moreover, in a graphical application example where still or motion-picture imagery will be the end result, then in accordance with known principles the timing of the modulation can be coordinated with directing the light, 31 and/or 32, through filters, or changing the wavelength (color) of the light, etc. to provide a color image. This can be done using multiple mirror elements 11 per pixel (each as a subpixel of a color) or resetting and flashing the SLM 10 multiple times per frame (sub-frames for each of several colors) or by using other known ways of providing a color image using a two-state modulator. Moreover, as will be appreciated, even in the example where two positions (only) are allowed for the mirror 12, the length of time light is reflected to the "on" direction (31 in one example) can be used to vary a parameter of the modulated light, for example the amount of light perceived at that pixel (or sub pixel). Thus a grey scale in the array can be created in a frame by the length of time the mirror remains at a location corresponding to an "on" state and is flooded by light 29. This time can be controlled by the amount of electrons applied to a particular "pixel" (mirror), vs. secondary electron radiation, as mentioned, as the bleed off rate through the resistor 34 is a known function of time and charge differential across the resistor.

As will now be appreciated, these properties can be used to create black and white and color images (not shown) for video, still, graphics slide, and other format, information display in one example application. Moreover, the properties can be used in telecommunications switching of individual light beams directed at each mirror location in another example application (not shown), for spatial control of light in holography in another example (not shown), and read/write functionality in holographic memory applications in another example (not shown), and in other applications not included in these examples.

Moreover, in another example, the SLM (10 in FIG. 1) is reversed within the CRT 21, so that the electrodes 18 instead of the mirrors 12 intercept the electron beam, and light does not travel through the substrate etc. but is reflected from a "back" side of the mirror elements 11 as discussed in the foregoing illustrated examples. In this example the change in charge is on the electrode, but the device in this example actuates the mirror element by capacitive storage of charge or release of capacitive charge, depending on the relative charge at the electrode plate and the mirror element.

Moreover, in another example embodiment the SLM can remain in the same position but light to be modulated enters and leaves the CRT through sidewalls of the tube from the rear, and is thus reflected by the "back" side of the mirror elements, the same side that intercepts the electron beam but in each case otherwise these examples function as described herein.

Also, in another example, the charge can be released through another pathway. For example all the electrodes 18, or alternatively all the mirror elements 11, can be connected to a common potential which is controllable, or each element connected to one each of two grounds, one ground for the electrodes one for the mirror elements. Moreover, with other configurations the mirror elements can be moved or not moved in successive scans. That charge bleed-off discussed herein, or otherwise configuring the device for controlling the charge between the mirror and the electrode, and thus the mirror position, can be accomplished in other ways will be apparent to those skilled in the art.

In another example embodiment, all of the mirror elements can be returned to a default position between each scan, for example returning to the second position (11' mirror position in FIG. 2) by a flood electron beam from a flood electron source (not shown) adjacent the focused electron beam 23 cathode 25 source. For example, one scan can be used to charge (set) the array and one to clear it; or one scan to set and one electron flood to clear alternating; or successive scans refreshing the charge holding the mirror or changing the charge so as to change the mirror position as to each mirror successively as the beam proceeds through each and every scan can be used. (It will be appreciated that the positive and negative "images" carried by the light streams (31, 32 in FIGS. 1 and 2) can be reversed where the second position is made the one the mirrors are made to return to when re-setting the array). These are just some of the ways of controlling the mirror elements that can be given by way of example using the principle that the mirror element will move from the second to the first position after a known time due to charge bleed-off.

However, in the illustrated embodiment there is simply a desire to have the mirror elements 11 be able to be brought to the undeformed or first position and remain there until needed to be moved again. Vice versa, it would be desirable for the second position to be a stable and repeatable position in the illustrated embodiment. The later can be accomplished inherently, as the mirror is stopped by the dielectric layer 19 overtop the electrode, and accordingly the angle of the mirror 12 in the second position is set by the height of the post 14 and size of the mirror element 11. However, the stop element 24 is provided adjacent the first position to keep the mirror element from going well past the first position and "ringing" as discussed above.

Figure 6:
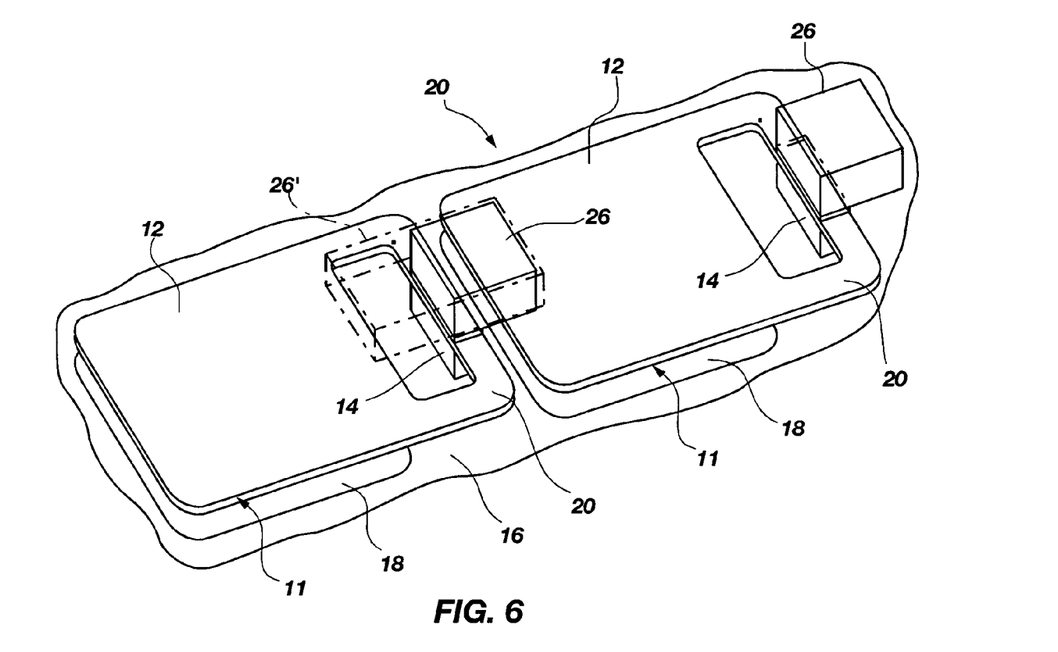
FIG. 6 is a perspective schematical illustration of a broken-out portion of a mirror array of a spatial light modulator in accordance with an example embodiment of the invention, a configuration of the stop element in a further example embodiment being shown in outline.

The stop 24 can take other forms besides that shown in FIGS. 1–5. For example with reference to FIG. 6, in another embodiment a wider stop 26 can be configured as before described, but to be wider and shorter, so that it contacts the mirror over a wide but shallow area, rather than a thinner but deeper area. In another example embodiment the stop 26' (shown in outline) can be configured to be similarly carried by the mirror pedestal, but to overhang both the mirror portion 12 of the mirror element supported by the same pedestal 14 as well as the mirror portion of the adjacent mirror element 11. The stop thus assists in providing a motion check on movement in the second direction of the mirror supported by the same pedestal, catching it at a proximal edge adjacent the opening, as well as checking movement of the adjacent mirror, catching it at a distal edge in the same way as in the example shown in FIGS. 1–5. Thus, the mirror portion of each mirror element would have a stop adjacent both its distal edge and its proximal edge.

Figure 7:
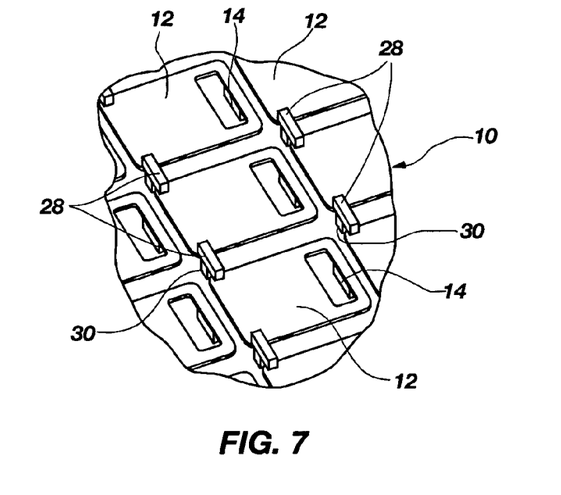
FIG. 7 is a perspective schematical illustration of a broken-out portion of a mirror array of a spatial light modulator in accordance with another example embodiment of the invention.

With reference to FIG. 7, in another example embodiment, instead of a stop carried by an adjacent mirror pedestal 14, each mirror element 11 has associated with it two stops 28 carried by separate pedestals 30. Likewise, each stop serves two adjacent mirror elements. This example provides redundancy, but is more complex structurally than that shown in FIGS. 1–6, for example.

It will be appreciated that other configurations can be employed, but these examples will serve to illustrate the principles involved in providing the functionality discussed herein.

The examples discussed above can be made in a number of conventional ways. With reference now to FIGS. 8–26, the following description outlines, and the figures illustrate, one process for making the modulator example shown in FIGS. 1–5. Fabrication of one mirror element (11 in FIGS. 1–5) and associated structure will be described. It will be appreciated that this is repeated for each element by appropriate patterning in the fabrication technique used, so as to lay down/form all the elements, and associated structure, including stops, and current pathways, etc. for the entire SLM (10 in FIGS. 1–5).

Figure 8:
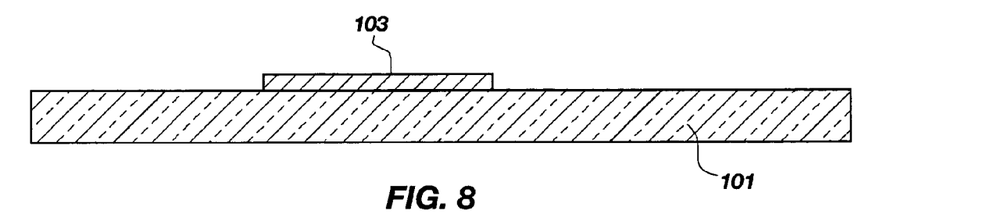
FIG. 8 is a schematic crossectional view of a glass substrate with a resistor formed thereon in a first step.

First, with reference to FIG. 8, this example fabrication process for the modulator (10 in FIGS. 1–5) can include the step of making a resistor 103 (34 in FIGS. 1–5) for each mirror. It is through this resistor that the charge will be dissipated at a predetermined rate, so that the mirror (12 in FIGS. 1–5) will remain in the tilted position for a predictable period of time based on the charge differential applied, as discussed above. For this period of time to be predictable, the resistor fabrication must be consistent and controlled. A light-transmissive material (such as glass or quartz) substrate 101 (16 in FIGS. 1–5) has sheet resistor 103 material deposited on it by a conventional method, including direct deposition methods (e.g. printing methods) and layer deposition and photo/etch methods. The resistor material thus deposited and formed is chosen and configured so as to cooperate with the mirror element 11 and electrode 18 to give a desired time delay range for each mirror element before movement from the second to the first position subsequent to a scan at an energy level within a selected beam energy range.

Figure 9:
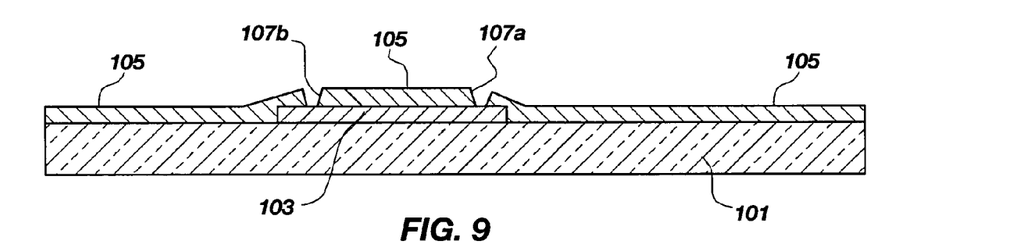
FIG. 9 is a schematic crossectional view of a glass substrate and resistor and a dielectric layer with openings therein formed thereon in a second step.
Figure 10:
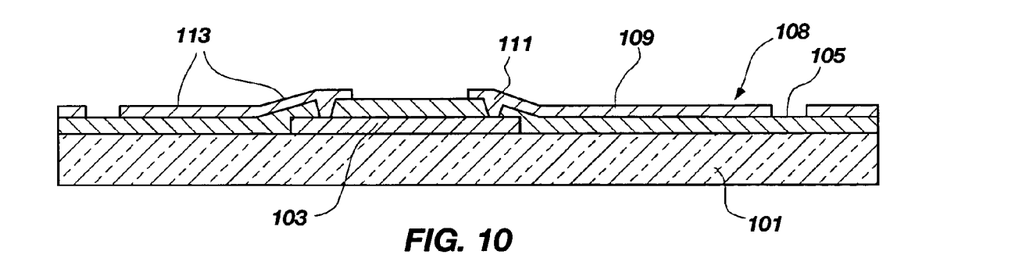
FIG. 10 is a schematic crossectional view of a glass substrate, resistor, dielectric layer with an ITO conductor layer forming an electrode and conductive pathway through the resistor formed thereon in a third step.
Figure 11:
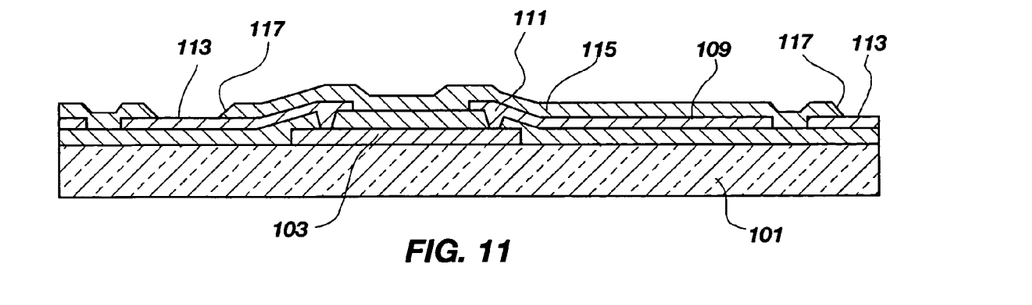
FIG. 11 is a schematic crossectional view of a glass substrate, resistor, dielectric layer with an ITO conductor layer forming an electrode, and conductive pathway through the resistor to a post location, with a further dielectric layer formed thereon in a forth step.

Next, with reference to FIG. 9, an insulating layer 105 of a transparent dielectric material, such as Tetra-Ethyl-Ortho-Silicate (TEOS) is then laid down over the substrate and the resistor 103, with contact openings 107a, 107b formed therein to accommodate a current pathway to the resistor. These contact openings are approximately the same width as the thickness of the TEOS layer. This TEOS layer formation is by a conventional technique, such as a deposition/photo/etch technique. Referring to FIG. 10, a transparent conductive layer 108 of ITO is then conventionally deposited and photo/etch shaped to form the electrode 109 (18 in FIGS. 1–5) and a conductor 111 connecting the electrode to the resistor 103 and a conductor 113 which will connect the resistor to the post (14 in FIGS. 1–5) and thereby to the mirror element (11 in FIGS. 1–5). Turning to FIG. 11, another insulating layer 115 of TEOS is then deposition/photo/etch formed (or otherwise formed by conventional methods) over the previous ITO layer, leaving an opening 117 for the post to directly contact the conductor 113 extending from the resistor 103 This insulating layer corresponds to the dielectric layer (19 in FIGS. 1–5) discussed above.

Figure 12:
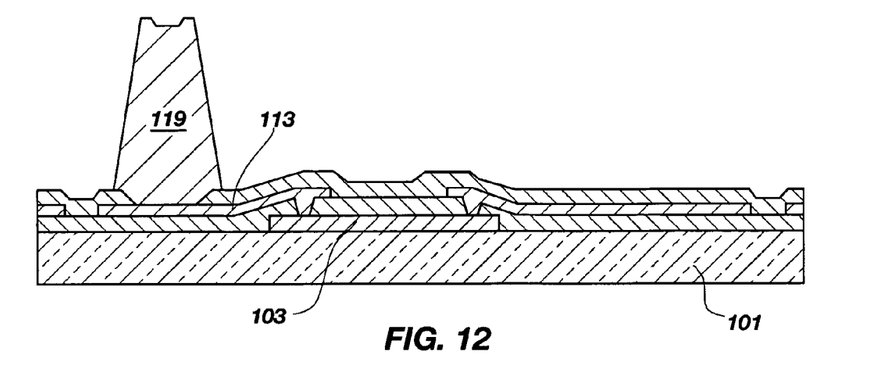
FIG. 12 is a schematic crossectional view of the example shown in FIG. 11 with a post formed thereon in contact with the conductor previously formed.

With reference to FIG. 12, metal post material 119, for example Aluminum or an alloy thereof, is formed into the pedestal, or post (14 in FIGS. 1–5) that will support the mirror element (11 in FIGS. 1–5). This is done by conventional deposition-photo/etching techniques. The base of the metal post (pedestal) is located over, and in contact with, the ITO conductor 113 coming from the resistor 103.

Figure 13:
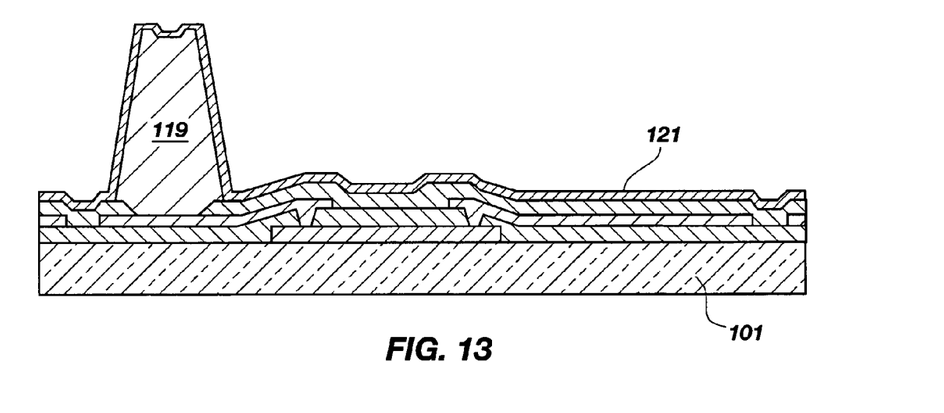
FIG. 13 is a schematic crossectional view of the example shown in FIG. 12 with a SiN diffusion barrier laid down over the structure.
Figure 14:
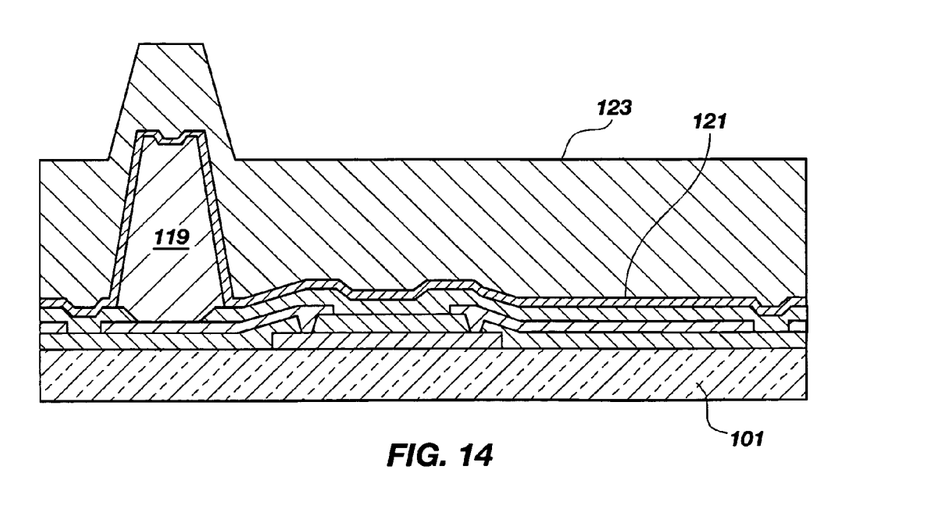
FIG. 14 is a schematic crossectional view of the example shown in FIG. 13 with a first release layer of Si deposited thereon.
Figure 15:
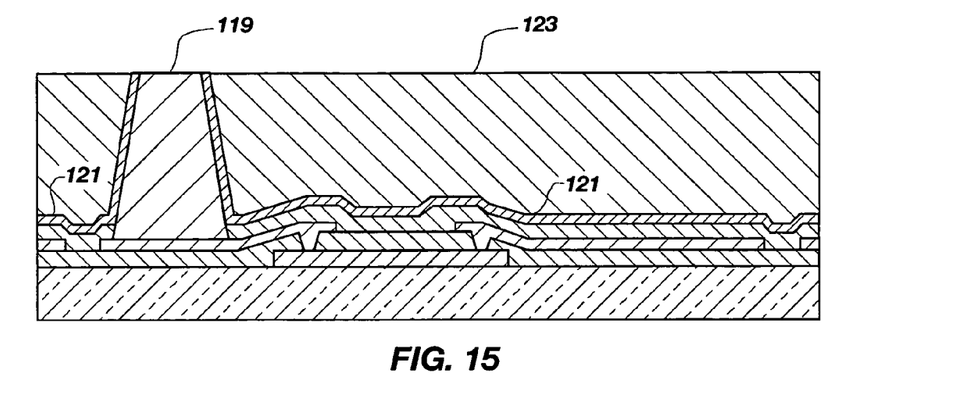
FIG. 15 is a schematic crossectional view of the example shown in FIG. 14 after a CMP process forming a planar surface and exposing a top portion of the post.
Figure 16:
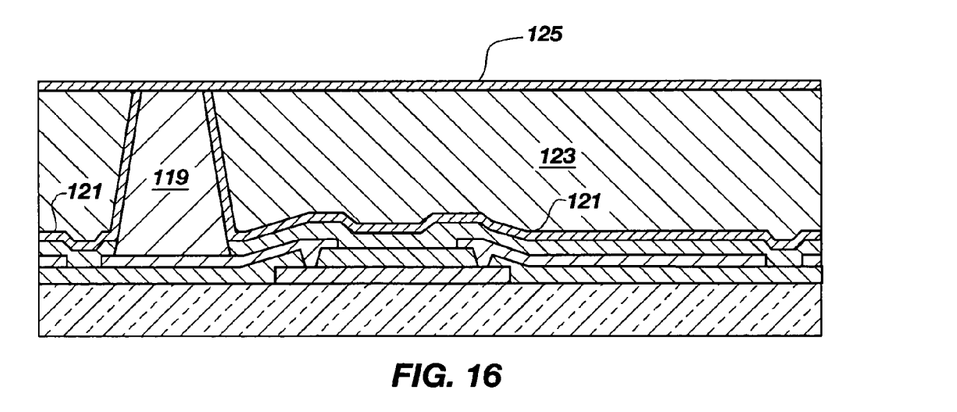
FIG. 16 is a schematic crossectional view of the example shown in FIG. 15 after deposition of a further SiN diffusion barrier over the planar surface.
Figure 17:
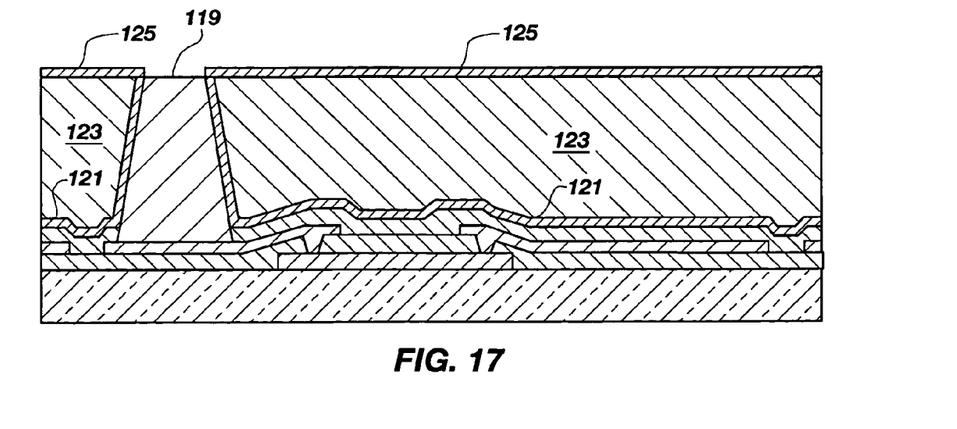
FIG. 17 is a schematic crossectional view of the example shown in FIG. 16 with a contact opening at the top of the post etched into said further diffusion barrier.
Figure 18:
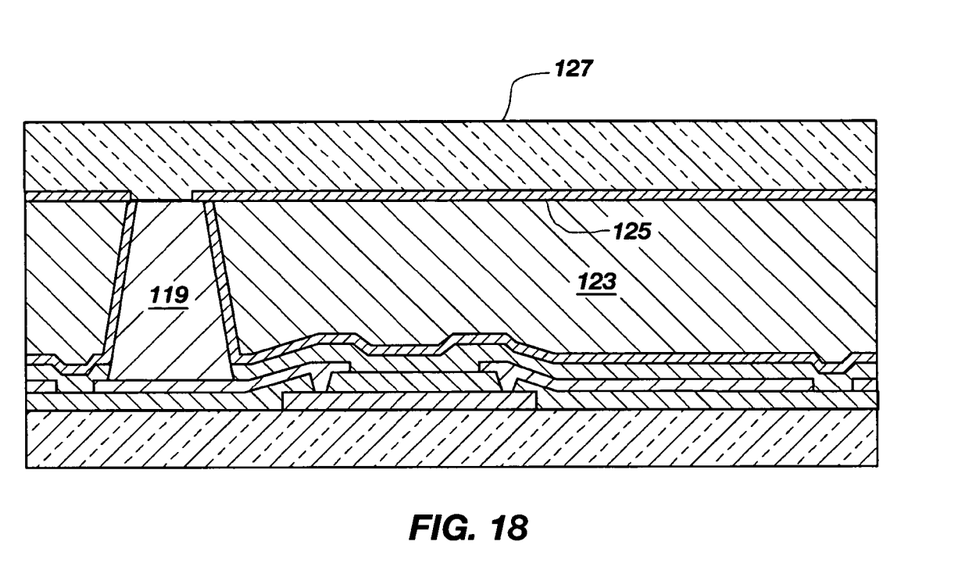
FIG. 18 is a schematic crossectional view of the example shown in FIG. 17, after deposition of an Al alloy metal layer for the mirror.

Next, as shown in FIG. 13, a diffusion barrier 121 formed of Silicon Nitride (SiN) is then deposited over the structure. Then, with reference to FIG. 14, a release layer 123 having a thickness slightly less in magnitude than the height of the post 121 is deposited over the structure. The structure is then planarized, using a chemical-mechanical planarization (CMP) technique, or other conventional planarization method resulting in the structure shown in FIG. 15. As shown in FIG. 16, this is then over-coated with a further diffusion layer 125 of SiN. This is then photo-etched to expose the top of the metal post 119 as illustrated by FIG. 17. With reference to FIG. 18 a metal layer 127, which can be Al or an alloy thereof is laid down. In the example this material is AlCu alloy and comprises the mirror (12 in FIGS. 1–5) material in this example. This metal layer is deposited using conventional techniques, such as vapor deposition, sputtering, etc.

Figure 19:
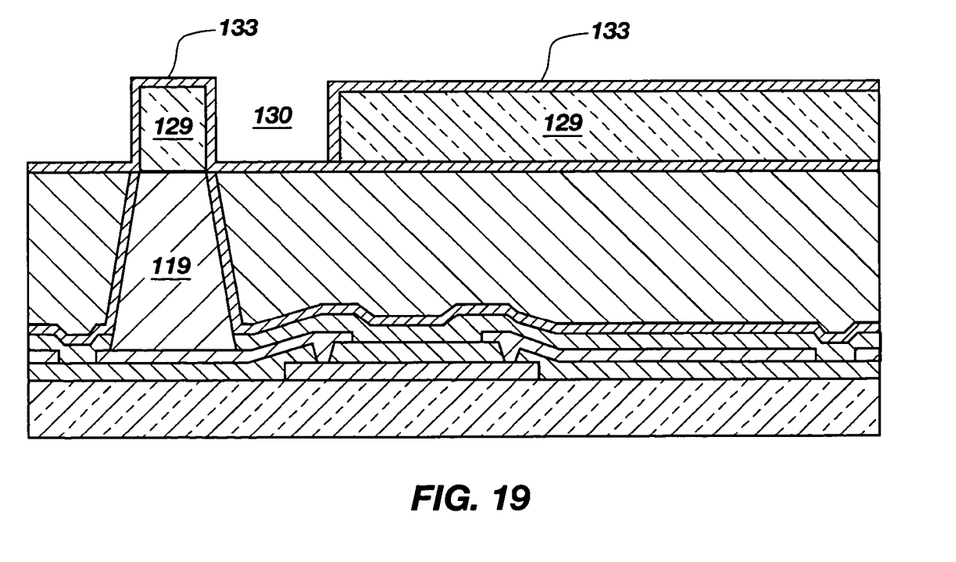
FIG. 19 is a schematic crossectional view of the example shown in FIG. 18, with the mirror subsequently photo-etched, and then another diffusion barrier of SiN laid down overtop the structure.
Figure 20:
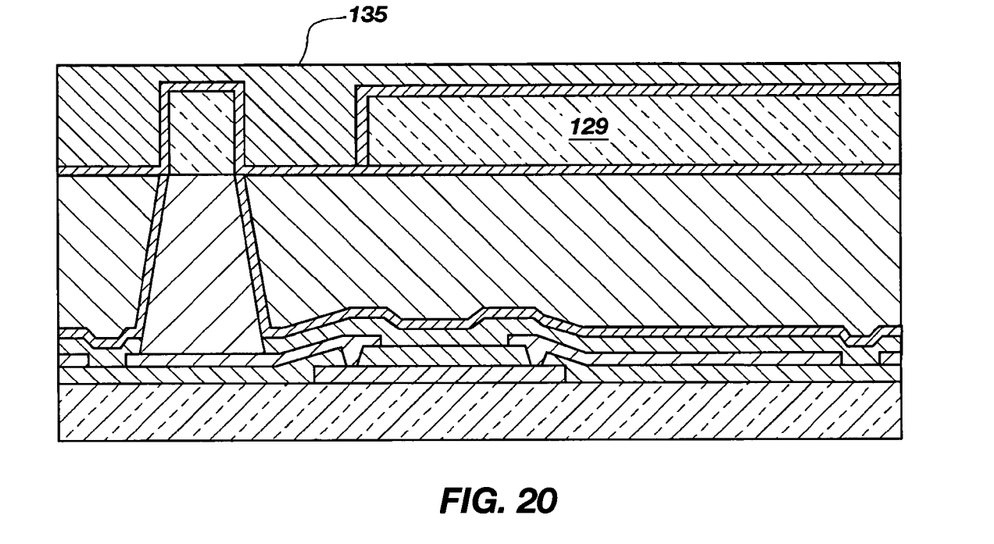
FIG. 20 is a schematic crossectional view of the example shown in FIG. 19 after deposition of a second Si release layer.
Figure 21:
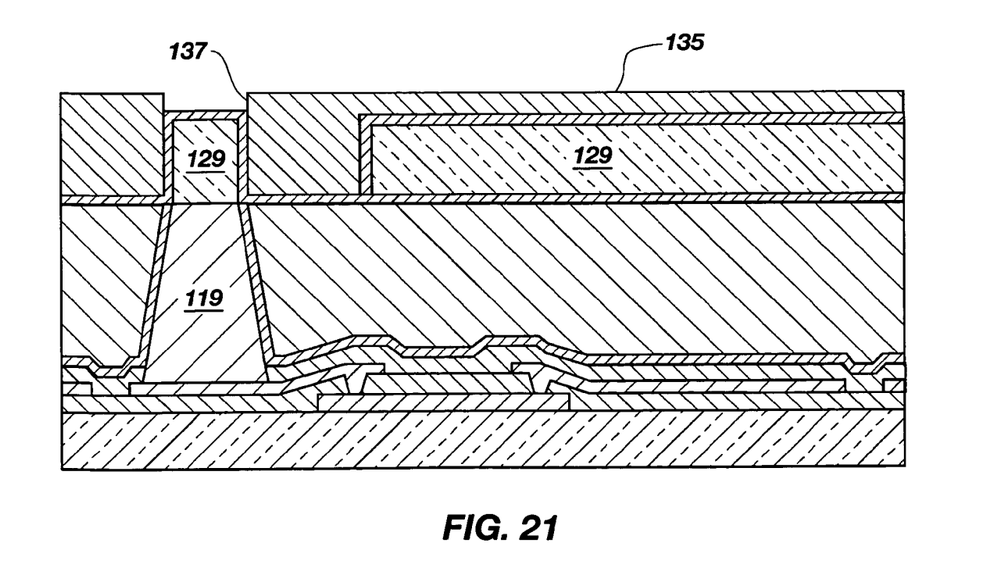
FIG. 21 is a schematic crossectional view of the example shown in FIG. 20 with an opening etched therein over the post and a mirror hinge portion for attachment of a stop portion to be deposited in a subsequent step.
Figure 22:
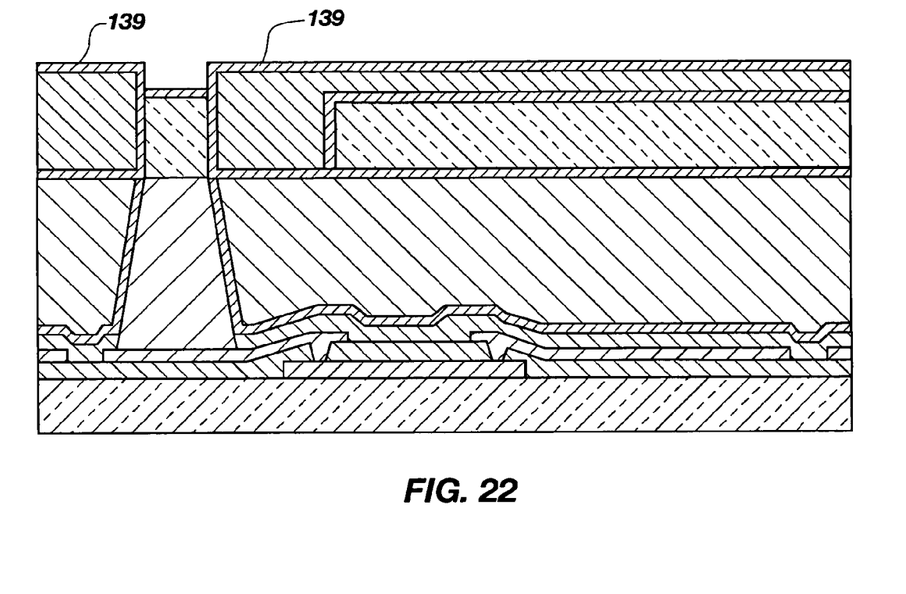
FIG. 22 is a schematic crossectional view of the example shown in FIG. 21 with another SiN diffusion barrier laid down over the structure.
Figure 23:
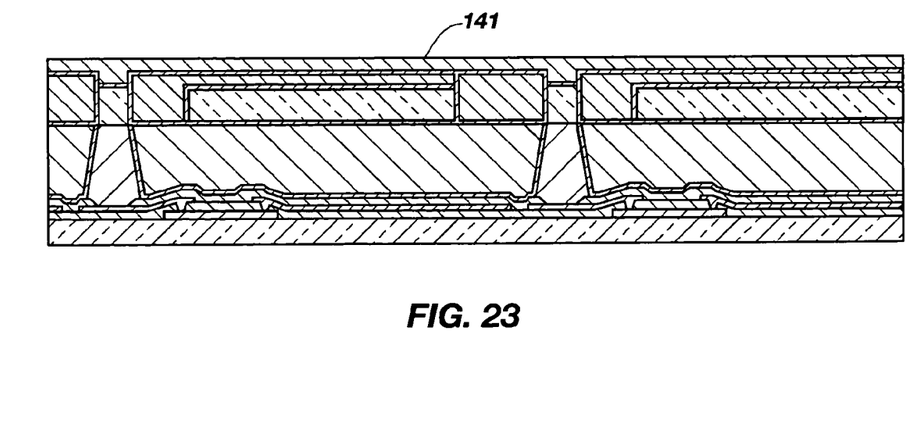
FIG. 23 is a schematic crossectional view of the example shown in FIG. 22 after deposition of an Al metal layer over the structure, from which the stop for each mirror element will be formed.
Figure 24:
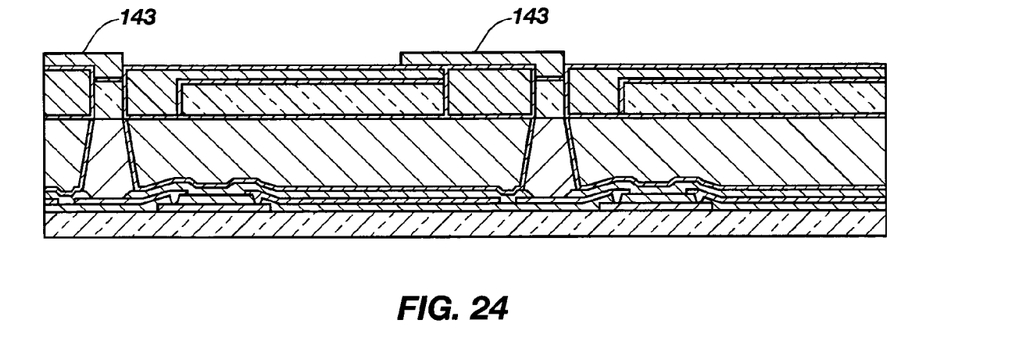
FIG. 24 is a schematic crossectional view of the example shown in FIG. 23 after photo etching of the metal layer to form the stop portions.
Figure 25:
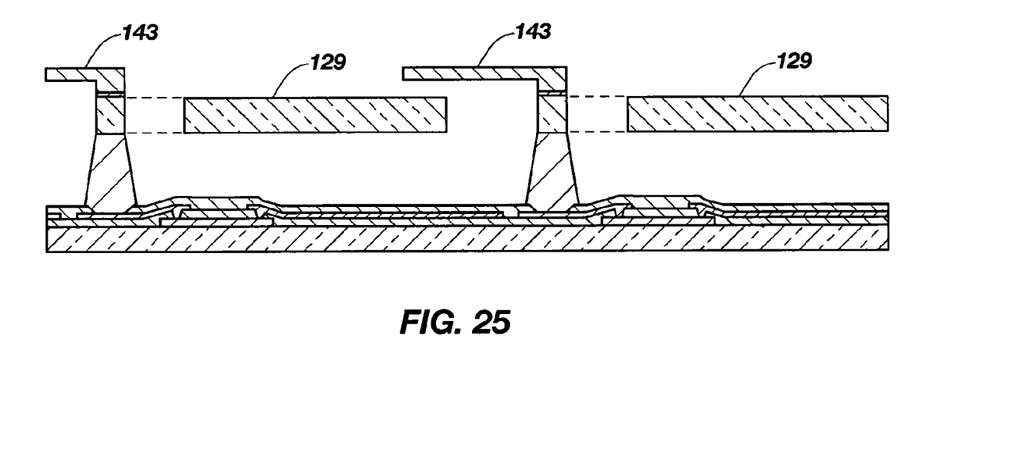
FIG. 25 is a schematic crossectional view of the example shown in FIG. 24 after etching of the Si release layers to free the mirrors.
Figure 26:
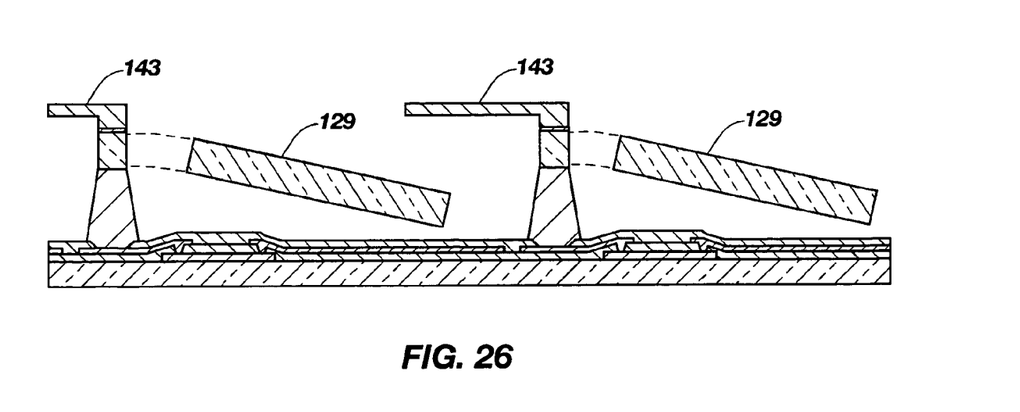
FIG. 26 is a schematic crossectional view of the example shown in FIG. 25 illustrating deflection of the mirrors by deformation of hinge portions thereof.

With reference to FIG. 19, a mirror element 129 (11 in FIGS. 1–5) of AlCu is photo/etch-formed into the shape discussed above; including the hole 130 (22 in FIGS. 1–5) adjacent the post 119, which hole helps define the hinge portions (20 in FIGS. 1–5) of the mirror element 129. Another diffusion barrier layer 133 of SiN is then deposited over the mirror element using conventional techniques. With reference to FIG. 20 a second Si release layer 135 is then laid down over the structure. Now, as shown in FIG. 21, the second release layer 135 previously laid down is photo-etched over the top of the pedestal (post) 119 to form a hole 137 to expose the mirror element there. With reference to FIG. 22, another diffusion barrier layer 139 of SiN is now deposited over the structure. A layer 141 of metal such as Al or an aluminum alloy is then conventionally deposited as shown in FIG. 23, and as shown in FIG. 24 this layer is photo-etched to form the stop element 143 (24 in FIGS. 1–5) atop the mirror element 129 over the post 119. With reference to FIG. 25 the Si release layers 123, 135 are then etched away to free the mirror element 129 at each location of the array. As seen in FIG. 26, they are then able to deflect as described above.

With reference to all the drawing figures, it will be appreciated that the invention enables a SLM 10 which can be made at relatively low cost and which can be more reliable and provide higher refresh rates. Moreover, the simplicity of mechanical containment of the mirror element to a prescribed range of movement gives advantages described with relatively little increase in complexity or cost.

However, while the forgoing descriptions of example embodiments illustrated and described herein give aid in understanding some of the ways in which the invention can be implemented, it should be borne in mind that various modifications can be made consistent with, and within the scope of, the invention set forth in the appended claims; and the examples described above are not to be construed as limiting of the scope of the invention, which is set forth in the appended claims.

The invention claimed is:

1. A light modulator, comprising:
an array of electron beam addressable mirror elements, further comprising an actuatable mirror element having mirror surface that has a proximal edge portion supported by a post and a hinge portion, and a distal edge portion on an opposite end of the mirror surface from the proximal edge portion and two side edge portions extending from the proximal edge portion to the distal edge portion having an electrostatically more neutral first position and an electrostatically more charged second position, the mirror being actuatable in a first direction from the first position to the second position by charge accumulation received at the mirror from an electron beam, and is actuatable in a second direction from the second position to the first position by dissipation of the charge accumulation;
a stop element positioned adjacent the mirror element in the first position, configured to limit movement of the mirror element in the second direction after the mirror reaches the first position, wherein the stop element is positioned to intercept a first mirror element adjacent the proximal edge portion; and
a further stop element configured to intercept a second mirror element adjacent the distal edge portion.

2. A light modulator as set forth in claim 1, further comprising an electrode adjacent the mirror element.

3. A light modulator as set forth in claim 2, wherein the electrode is configured to allow light to pass therethrough.

4. A light modulator as set forth in claim 2, further comprising a resistor in electrical communication with the mirror element and the electrode and configured to dissipate charge differential therebetween at a known rate.

5. A light modulator as set forth in claim 1, wherein the modulator is configured to be operable in a vacuum environment.

6. A light modulator as set forth in claim 5, wherein the modulator is configured to be carried within a CRT.

7. A light modulator as set forth in claim 1, wherein the stop element is configured to absorb energy from the mirror element upon the mirror element striking the stop.

8. A light modulator as set forth in claim 7, wherein the stop element is configured to damp movement of the mirror element.

9. A light modulator, comprising:
an array of electron beam addressable mirror elements, the array including a actuatable mirror element including a mirror portion supported by a pedestal extending outward from the substrate and a hinge portion disposed intermediate the pedestal and the mirror portion, the mirror portion of the mirror element having a first nominal charge position essentially parallel to the substrate whereto the mirror is returned by dissipation of charge and a tilted charged position tilted inward toward the substrate, the mirror actuatable in a first direction from the first position to the second position by interception of electrons from an electron beam, and actuatable in a second direction from the second position to the first position by dissipation of said charge;
an electrode carried by the substrate adjacent the actuatable mirror element configured to cooperate with the actuatable mirror element and an electron beam in moving the mirror element from the first position to the second position;

a charge dissipation pathway, configured for controllably dissipating charge on the mirror element in moving the mirror element from the second position to the first position;

a stop carried by the substrate and configured to inhibit outward movement of the mirror portion of the mirror element beyond the first position.

10. A light modulator as set forth in claim 9, wherein the stop is also carried by a pillar supporting an adjacent mirror element of the array.

11. A light modulator as set forth in claim 10, wherein the stop extends over an outward facing portion of the mirror portion of the adjacent mirror element.

12. A light modulator as set forth in claim 11, wherein the stop extends at least ten percent of a distance across the mirror portion in one dimension.

13. A light modulator as set forth in claim 12, wherein the stop is longer than it is wide.

14. A light modulator as set forth in claim 9, wherein the modulator further comprises another stop and is configured so that mirror portion of the mirror element is stopped from movement in the second direction by a plurality of stops.

15. A light modulator as set forth in claim 9, wherein the stop is formed of the same material as the mirror element.

16. A light modulator as set forth in claim 15, wherein the array comprises a plurality of closely spaced mirror elements and wherein a stop carried by a pedestal intercepts a first mirror element adjacent the proximal edge and a second mirror element adjacent a distal edge.

17. A light modulator as set forth in claim 9, wherein the substrate and electrode are formed of a light-transmissive material.

18. A light modulator as set forth in claim 9, wherein the charge dissipation pathway further comprises a resistor configured to allow charge dissipation at a known rate.

19. A light modulator as set forth in claim 18, wherein the resistor is positioned intermediate the electrode and the pedestal.

20. A method of making a light modulator, comprising:
providing a substrate;
forming a post on the substrate;
forming a mirror element configured to receive a charge accumulation from an electron beam, wherein the mirror element is carried by the post and configured to move in a first direction toward the substrate by receiving the charge accumulation and in a second direction away from the substrate by charge dissipation;
forming an electrode adjacent the mirror element;
forming a controllable charge dissipation pathway between the electrode and the mirror element; and
forming a stop carried by the substrate and configured to stop movement of the mirror element in the second direction beyond the stop.

21. The method of claim 20, further comprising forming the stop so that it is also carried by the post.

22. The method of claim 21, further comprising forming the stop over the mirror element so that it is also carried by the mirror element and acts as a stop for an adjacent mirror element.

23. The method of claim 20 further comprising forming a resistor in the charge dissipation pathway configured to control a rate of dissipation of charge.

24. The method of claim 20, further comprising using a photo-etching technique to form at least some structure therein set forth.

25. The method of claim 20, further comprising providing a release layer and using an etching process in formation of at least some structure therein set forth.

26. The method of claim 20, further comprising making the substrate of a light-transmissive material.

27. The method of claim 20, further comprising configuring the modulator to be operable in a vacuum environment.

28. The method of claim 27, further comprising placing the modulator within a CRT.

29. The method of claim 27, further comprising configuring the stop to absorb energy from the mirror element upon the mirror element striking the stop.

30. The method of claim 29, further comprising configuring the stop to damp movement of the mirror element in a vacuum environment.

31. A spatial light modulator, including:
an array of electron beam addressable mirror elements, the array including a actuatable mirror element including a mirror portion supported by a pedestal extending outward from the substrate and a hinge portion disposed intermediate the pedestal and the mirror portion, the mirror portion of the mirror element having a first nominal charge position essentially parallel to the substrate whereto the mirror is returned by dissipation of charge and a tilted charged position tilted inward toward the substrate, the mirror actuatable in a first direction from the first position to the second position by interception of electrons from an electron beam, and actuatable in a second direction from the second position to the first position by dissipation of said charge;
an electrode carried by the substrate adjacent the actuatable mirror element configured to cooperate with the actuatable mirror element and an electron beam in moving the mirror element from the first position to the second position;
a charge dissipation pathway, further including a resistor configured for dissipating charge on the mirror element at a known rate in moving the mirror element from the second position to the first position in a controlled way; and
a stop carried by the substrate and configured to inhibit outward movement of the mirror portion of the mirror element beyond the first position.

32. A light modulator, comprising:
at least one mirror element having a first position and a second position;
at least one electrode adjacent a respective at least one mirror element;
means for moving the element between the first and second position;
means for placing charge on the element to move the element between the first and second position using an electron beam;
means for removing charge on the element to move the element between the second and first positions including a controllable charge dissipation pathway between the at least one electrode and the at least one mirror element; and
means for preventing oscillations of the element after it returns to the first position.

* * * * *